United States Patent Office 3,283,646
Patented Nov. 8, 1966

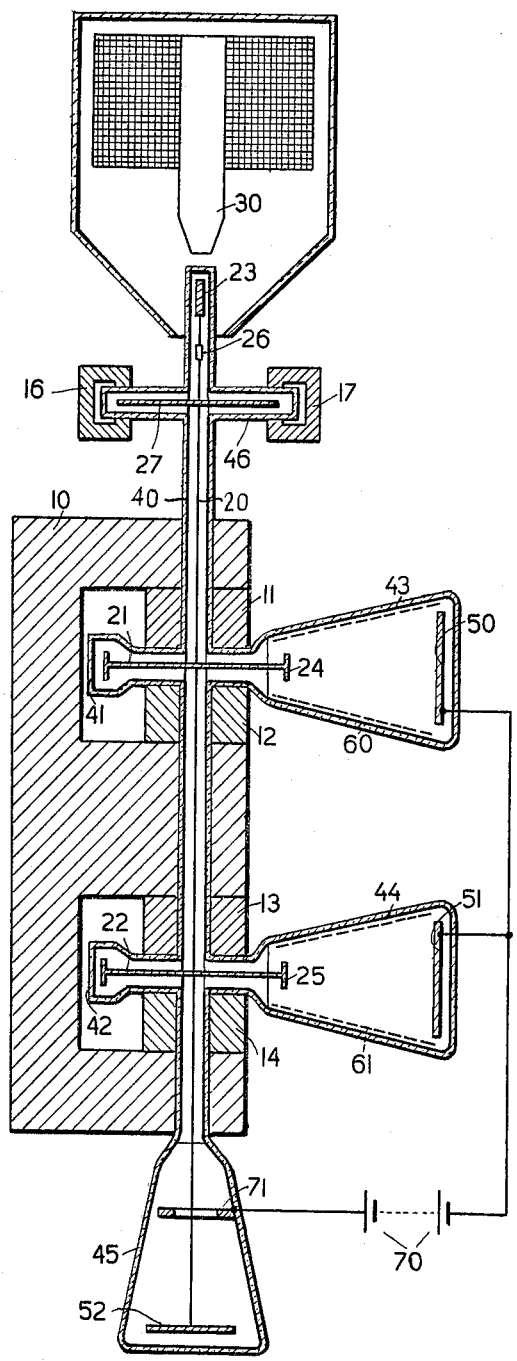

3,283,646
PHOTOCATHODE LIGHT SIGNAL MEASURING DEVICE
Vítězslav Havlíček and Alois Marek, Prague, Czechoslovakia, assignors to Vyzkumny Ustav Matematickych Stroju, Prague, Czechoslovakia
Filed Aug. 30, 1965, Ser. No. 483,641
Claims priority, application Czechoslovakia, Sept. 3, 1964, 4,928/64
4 Claims. (Cl. 88—23)

This invention relates to sensitive measuring apparatus, and particularly to measuring apparatus which relies on the angular movement of the rotor in a unipolar electric motor for indicating the physical values to be measured.

It is known to employ an electric motor as an integrating device for direct electric current which represents the physical values to be measured or integrated. The known devices rely on collectors and other sliding contacts for transmitting current to the movable parts of the motor, hereinafter referred to as rotor. The friction at the contacts is a source of serious error and lowers the sensitivity of the apparatus if extremely weak signals are to be measured.

An object of the invention is the provision of a motor-type measuring instrument which avoids mechanical contacts for feeding current to the rotor.

The invention, in its preferred embodiments, relies in part on frictionless suspension of the rotor by means of a known electromagnetic levitation system (see J. W. Beams, Electronics 27, 152; March 1954). The invention furthermore relies upon mounting the rotor in a vacuum of 1.0 to 0.01 microns Hg, or even better. At the core of the invention is the transmission of current to the rotor by streams of charged particles between spaced electrodes respectively mounted on the rotor and on the stationary part of the apparatus.

Other features and many of the attendant advantages of this invention will be readily apparent from the following detailed description of a preferred embodiment when considered with the attached drawing, the sole figure of which illustrates a measuring instrument of the invention in an elevational sectional view, and partly in a conventional manner.

Referring to the drawing in detail, the supporting structure of the illustrated instrument includes an E-shaped yoke 10 of soft iron carrying four permanent magnets 11, 12, 13, 14 between its arms in such a manner that pairs of magnets 11–12 and 13–14 define two vertically superposed horizontal gaps in the magnetic circuit. The poles of the permanent magnets are arranged in such a manner that the direction of flux in one gap is opposite to that in the other gap.

Aligned vertical bores in the arms of the yoke 10 and of the parmanent magnets 11 to 14 fixedly receive a generally tubular metal casing 40 which is sealed and evacuated. The bottom end of the casing 40 is sealed to a glass bulb 45. Axially spaced radial enlargements 41, 42 of the casing 40 respectively extend into the two gaps of the magnetic circuit. Conical glass flasks 43, 44 are sealed to the enlargements 41, 42 of the casing 40 outside the magnetic circuit. An additional transverse enlargement 46 is provided on the top portion of the casing 40 which projects from the yoke 10.

A straight vertical wire 20 of conductive non-magnetic material is rotatably centered in the casing 40 by a levitation system of the afore-mentioned type of which only an electromagnet 30 axially aligned with the casing 40 and a magnetic pin 23 on the top end of the wire 20 are illustrated. The wire 20 is the shaft of a rotor which also includes several discs of generally circular configuration which are coaxially mounted on the wire. Discs 21, 22 are respectively spacedly enveloped by the enlargements 41, 42 of the casing 40. Their central portions are conductively attached to the wire 20, and their circumferential rims carry cylindrical flanges 24, 25 which extend into the narrow ends of the flasks 43, 44.

The top portion of the wire 20 carries a coaxial metallic disc 27 which is freely rotatable in the casing enlargement 46. Two permanent magnets 16, 17 are mounted on the last mentioned enlargement in such a manner as to generate eddy currents in the disc 27 when the latter rotates with the wire 20.

The bottom portion of the wire 20 extends into the bulb 45 and its free end near the bottom of the bulb 45 carries a photocathode 52 which is a flat circular disc coaxial with the wire 20. A light source, not itself shown, permanently illuminates the photocathode 52 when the device is in operation. An annular collector electrode 71 spacedly circles the wire 20 above the cathode 52.

The flasks 43, 44 each contain a flat photocathode 50, 51 arranged parallel to the bottom of the flask and facing the portion of an associated flange 24, 25 which constitutes a collector electrode for receiving electrons emitted by the photocathode. The conical walls of the flasks 43, 44 are covered with electrostating shields 60, 61 for concentrating the electron streams from the cathodes 50, 51 on the associated collector electrodes.

The positive pole of a battery 70 is connected to the electrode 71 in the bulb 45, and the negative pole to the two photocathodes 50, 51. An index mark 26 on the top portion of the wire 20 is part of a conventional system, not otherwise shown, for indicating the angular position of the wire 20 relative to the stationary instrument parts.

The above-described instrument is operated as follows:

A physical value to be measured is converted into a light beam which is directed against one of the photocathodes, for example the cathode 50, while the photocathode 52 is permanently exposed to light. The applied voltage of the battery 70 causes a stream of electrodes to flow from the cathode 50 to the rim of the disc 21, thence radially across the disc to its central portion attached to the wire 20, through the wire to the photoelectrode 52, to the collector electrode 71, and back to the battery.

When the light illuminating the photocathode 52 is of constant intensity, or if the photocathode 52 is operated in the saturated portion of its characteristic, the magnitude of the current or stream of electrons is uniquely related to the intensity of the light signal incident on the photocathode 50. The current flowing from the flange 24 to the wire 20 passes at right angles through the magnetic flux between the magnets 11 and 12, and a corresponding torque is applied to the disc 21, and to the rotor as a whole. The wire 20 is turned at a rate which is related to the strength of the current, and the total angular displacement of the wire 20 is a measure of the integral of the light signal on the photocathode over the time of measurement. The angular displacement may be read from the index mark 26.

When two independent light signals are applied to the photocathodes 50, 51 respectively, the torque exerted by the current associated with the cathode 51 is opposed to that applied to the disc 21 because of the opposite directions of the magnetic flux in the associated gaps of the magnetic circuit. The reading derived from the position of the mark 26 is indicative of the difference of the physical values represented by the light signals respectively received by the cathodes 51, 52.

The disc 27 operates as a magnetic damper in a conventional manner not requiring more detailed description.

The instrument of the invention is entirely free of mechanical friction because of the use of the known levitation system, the absence of air in contact with moving elements of the instrument, and the transmission of current from the stationary parts of the apparatus to the rotor by streams of charged particles traveling through the vacuum in the cavity of the casing 40 without mechanical contact between the rotor and the stationary structure.

While the invention has been described with specific reference to an instrument having its signal sensing photocathodes 50, 51 mounted on the stationary instrument parts, it will be appreciated that the flanges 24, 25 may carry photocathodes, and that collector electrodes may replace the electrodes 50, 51 in the flasks 43, 44 if the polarity of the battery 70 is reversed. The corresponding modification required in the electrodes 52, 71 will be obvious. It is also evident that a stream of charged particles may be modulated otherwise than by a light signal falling on a photocathode, and those skilled in the art will readily substitute other signal responsive electrodes for the cathodes 50, 51 in the light of the above teachings.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What we claim is:
1. In a measuring apparatus, in combination:
 (a) a support;
 (b) an evacuated casing fixedly mounted on said support;
 (c) a shaft having a vertically extending axis mounted in said casing for rotation about said axis;
 (d) a disc having a central portion mounted on said shaft in said casing adjacent said axis, said disc and said shaft being of electrically conductive material, and said disc having a rim portion remote from said axis;
 (e) a source of magnetic flux axially passing through a portion of said disc intermediate said rim portion and said central portion;
 (f) first electrode means on said rim portion;
 (g) second electrode means fixedly mounted in said casing;
 (h) a source of voltage;
 (i) circuit means connecting said source to said shaft and to said second electrode for applying a voltage to said first and second electrode means, one of said electrode means being responsive to the applied voltage and to a signal to be measured for passing a stream of charged particles between said electrode means, and, passing the charge of said particles through said disc, said shaft, said circuit means, and said source of current, whereby said charge passes through said magnetic flux and a torque is applied to said disc and said shaft; and
 (j) means for indicating the angular position of said shaft relative to said support.

2. In an apparatus as set forth in claim 1, magnetic means for keeping said shaft freely suspended in said casing for rotation about said axis thereof.

3. In an apparatus as set forth in claim 1, said circuit means including third electrode means on said shaft and fourth electrode means fixedly mounted in said casing, and spaced from said third electrode means, one of said third and fourth electrode means being responsive to the voltage of said source of voltage for passing a stream of charged particles therebetween.

4. In an apparatus as set forth in claim 1, said one electrode means being a photocathode, and said signal being a light signal.

No references cited.

MILTON, O. HIRSHFIELD, *Primary Examiner.*

J. W. GIBBS, *Assistant Examiner.*